US012625755B2

(12) United States Patent
Bailey

(10) Patent No.: US 12,625,755 B2
(45) Date of Patent: May 12, 2026

(54) ERRORS IN DISTRIBUTED COMPUTING ENVIRONMENTS

(71) Applicant: International Business Machines Corporation, Armonk, NY (US)

(72) Inventor: Christopher Neil Bailey, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/196,473

(22) Filed: May 12, 2023

(65) Prior Publication Data

US 2024/0378105 A1 Nov. 14, 2024

(51) Int. Cl.
*G06F 11/00* (2006.01)
*G06F 11/07* (2006.01)
*G06Q 20/10* (2012.01)

(52) U.S. Cl.
CPC ........ *G06F 11/079* (2013.01); *G06F 11/0709* (2013.01); *G06Q 20/10* (2013.01)

(58) Field of Classification Search
None
See application file for complete search history.

(56) References Cited

U.S. PATENT DOCUMENTS 10,783,473 B2 9/2020 Howie
11,178,025 B1 11/2021 Thornhill 2018/0115463 A1* 4/2018 Sinha .................. H04L 41/5067
2020/0021503 A1 1/2020 De Lima
2020/0409933 A1 12/2020 Ertl
2024/0378108 A1* 11/2024 Averdunk ........... G06F 11/0793

FOREIGN PATENT DOCUMENTS

EP 3154224 A1 * 4/2017 ......... H04L 12/2854

OTHER PUBLICATIONS

Google Scholar/Patents search—text refined (Year: 2024).*
Google Scholar/Patents search—text refined (Year: 2025).*
Google Scholar/Patents search—text refined (Year: 2026).*
Chen et al., "Graph-based Incident Aggregation for Large-Scale Online Service Systems", arXiv:2108.12179v1 [cs.LG] Aug. 27, 2021, 13 pps.
Hummel, "How SREs Found More Than $100 Million Using Failed Customer Interactions", 4 pps., Mar. 28, 2018, USENIX 2023, <https://www.usenix.org/conference/srecon18americas/presentation/hummel>.

* cited by examiner

*Primary Examiner* — Christopher S McCarthy
(74) *Attorney, Agent, or Firm* — Joseph P. Curcuru

(57) ABSTRACT
Embodiments of the present invention provide concepts for quantifying impact of one or more errors in a distributed computing environment. A processor may detect, at a caller entity of the distributed computing environment, an error resulting from a request from the caller entity to a callee entity of the distributed computing environment. The processor may associate the detected error with a callee incident, the callee incident describing an abnormal operating condition of the callee entity. The processor may quantify an impact of the error based on callee incident associated with the detected error and a service level metric of the distributed computing environment.

20 Claims, 7 Drawing Sheets

100

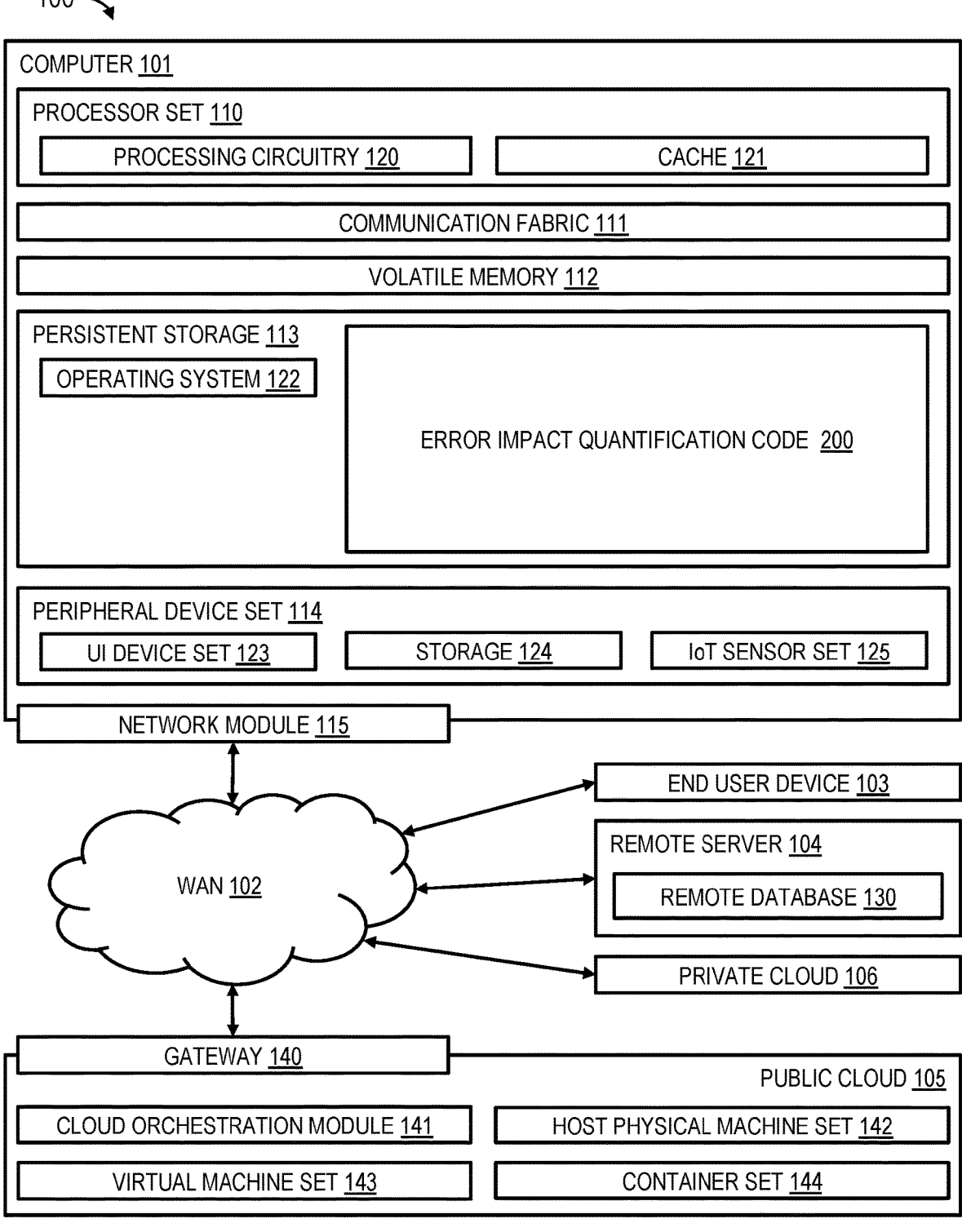

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

ERROR IMPACT QUANTIFICATION CODE  200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 2

ERRORS IN DISTRIBUTED COMPUTING ENVIRONMENTS

BACKGROUND

The present disclosure relates generally to distributed computing environments and, more specifically, to assessing the impact of errors or incidents in a distributed computing environment.

When an error or incident occurs within a distributed computing environment, the error/incident is typically categorized as affecting the availability (e.g., an outage), performance (e.g., a latency issue) or correctness (e.g., unexpected error) of the computing environment.

With an increase in adoption of Service Level Objectives (SLOs) and associated error budgets, there is a trend towards measuring and reporting the impact of errors/incidents against those SLOs and associated error budget. For example, a correctness SLO of 99.9% allows for an error budget of 0.1%, meaning that 0.1% of requests can respond with an error. When an incident occurs due to unexpected errors, the number of errors may be quantified as they reduce the remaining error budget.

It may be desirable to accurately quantify and measure the impact of errors/incidents in distributed computing environments, in order to understand the impact of outages, prioritize appropriately, and/or to take mitigating action(s).

SUMMARY

An embodiment of the present invention provides a computer-implemented method for quantifying impact of one or more errors in a distributed computing environment. The method comprises: detecting, at a caller entity of or in the distributed computing environment, an error resulting from a request from the caller entity to a callee entity of the distributed computing environment; associating the detected error with a callee incident, the callee incident describing an abnormal operating condition of the callee entity; and quantifying an impact of the error based on the callee incident associated with the detected error and a service level metric of the distributed computing environment.

Another embodiment of the present invention provides a system comprising: one or more processors; and a computer-readable storage medium communicatively coupled to the processor and storing program instructions which, when executed by the processor, cause the processor to perform a method for quantifying impact of one or more errors in a distributed computing environment. The method comprising: detecting, at a caller entity of or in the distributed computing environment, an error resulting from a request from the caller entity to a callee entity of the distributed computing environment; associating the detected error with a callee incident, the callee incident describing an abnormal operating condition of the callee entity; and quantifying an impact of the error based on callee incident associated with the detected error and a service level metric of the distributed computing environment.

Another embodiment of the present invention provides a computer program product comprising a computer-readable storage medium having program instructions embodied therewith that, when executed, performs a method for quantifying impact of one or more errors in a distributed computing environment. The method comprising: detecting, at a caller entity of or in the distributed computing environment, an error resulting from a request from the caller entity to a callee entity of the distributed computing environment;

associating the detected error with a callee incident, the callee incident describing an abnormal operating condition of the callee entity; and quantifying an impact of the error based on the callee incident associated with the detected error and a service level metric of the distributed computing environment.

Proposed embodiments may thus provide one or more concepts for determining and quantifying a technical performance impact of an error and/or a business performance impact of an error. This may enable issues and/or actions to be prioritized (e.g., according to severity of performance impact). Thus, there may be provided a mechanism for determining failure impact, measuring and quantifying the effect on Information Technology (IT)/business metrics and Key Performance Indicators (KPIs), and associating that with information on individual impacted users and their activities.

The proposed embodiments may be employed in combination with conventional or existing distributed computing environments, such as transaction processing environments, for example. In this way, embodiments may be integrated into legacy systems so as to improve and/or extend their functionality and capabilities. An improved computing environment may therefore be provided by proposed embodiments.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 2 depicts an illustrative computing environment according to embodiments of the present invention.

Figure 1:
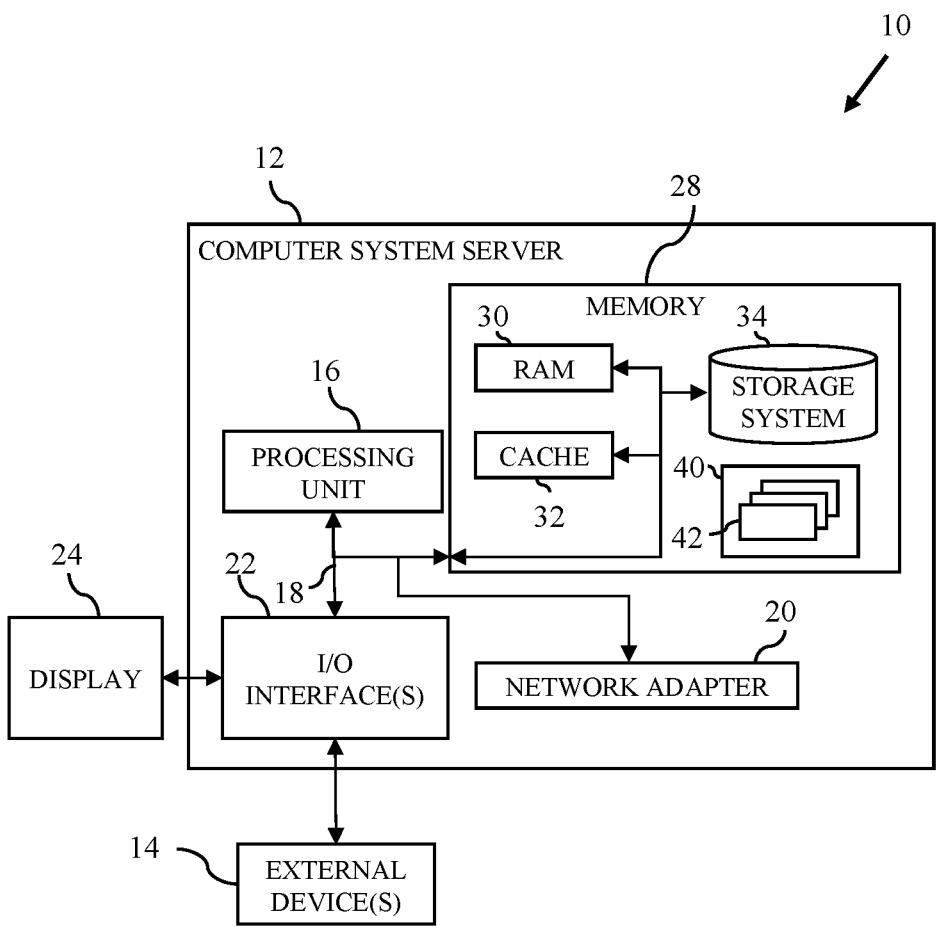
FIG. 1 depicts a computing node according to an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

The technical character of the present invention generally relates the field of distributed computing environments, and more particularly, to assessing the impact of errors or incident in a distributed computing environment. More specifically, embodiments of the present invention provide concepts for determining and quantifying a technical performance impact of an error and/or a business performance impact of an error.

For example, there is provided a method for quantifying impact of an error in a distributed computing environment. The method comprises: detecting, at a caller entity of or in the distributed computing environment, an error resulting from a request from the caller entity to a callee entity of the distributed computing environment; associating the detected error with a callee incident, the callee incident describing an abnormal operating condition of the callee entity; and quantifying an impact of the error based on callee incident associated with the detected error and a service level metric of the distributed computing environment.

Purely by way of initial example, embodiments may use distributed tracing in order to track end-to-end requests across applications, starting from user or endpoint interactions. In particular, embodiments may use distributed tracing to: (i) measure requests and determine failure impact; (ii) measure the effect on IT and business KPIs; and/or (iii) measure the Effect on Users.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Embodiments of the present disclosure may be implemented together with virtually any type of computer, regardless of the platform is suitable for storing and/or executing program code. Referring now to FIG. 2, depicted is a computing environment 100 suitable for executing program code related to the methods disclosed herein and for assessing the impact of errors or incidents in a distributed computing environment.

Computing environment 100 contains an example of an environment for the execution of at least some of the computer code involved in performing the inventive methods, such as a proposed method for quantifying impact of an error in a distributed computing environment (i.e., error impact quantification code 200). In addition to error impact quantification code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and error impact quantification code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in error impact quantification code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in error impact quantification code 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. In some embodiments, one or more of the operating system 122 and the error impact quantification code 200 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Figure 3:
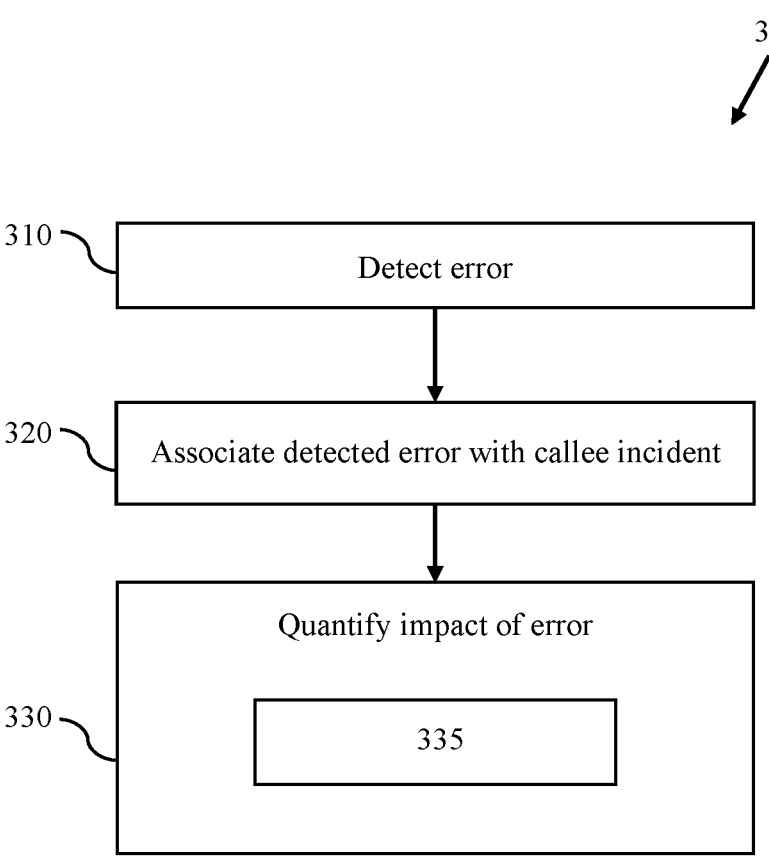
FIG. 3 illustrates a method for determining availability of a transaction in a processing environment according to an embodiment of the present invention.

Referring now to FIG. 3, shown is a flow diagram of a computer-implemented method 300 for quantifying impact of an error in a distributed computing environment. Here, the distributed computing environment comprises a transaction processing system.

The method begins with step 310 of detecting, at a caller entity of or in the distributed computing environment, an error resulting from a request from the caller entity to a callee entity of the distributed computing environment. Here, the request is a service request for requesting performance or delivery of a service by the callee entity.

Next, step 320 comprises associating the detected error with a callee incident, the callee incident describing an abnormal operating condition of the callee entity.

The method then proceeds to step 330 of quantifying an impact of the error based on callee incident associated with the detected error and a service level metric of the distributed computing environment. In this embodiment, the service level metric comprises a predetermined service level metric or key performance indicator associated with the callee entity.

More specifically, the step 330 of quantifying an impact of the error comprises sub-step 335 which includes calculating an impact value based on the callee incident associated with the detected error and a count value of the service level metric.

From the above description, it will be appreciated that the exemplary method of FIG. 3 may be employed to determine failure impact, measuring, and quantifying the effect on KPI. The failure impact may be associated with information on individual impacted users and their activities.

By way of further explanation of the proposed concept(s), reference will now be made to FIGS. 4-7.

Figure 4:
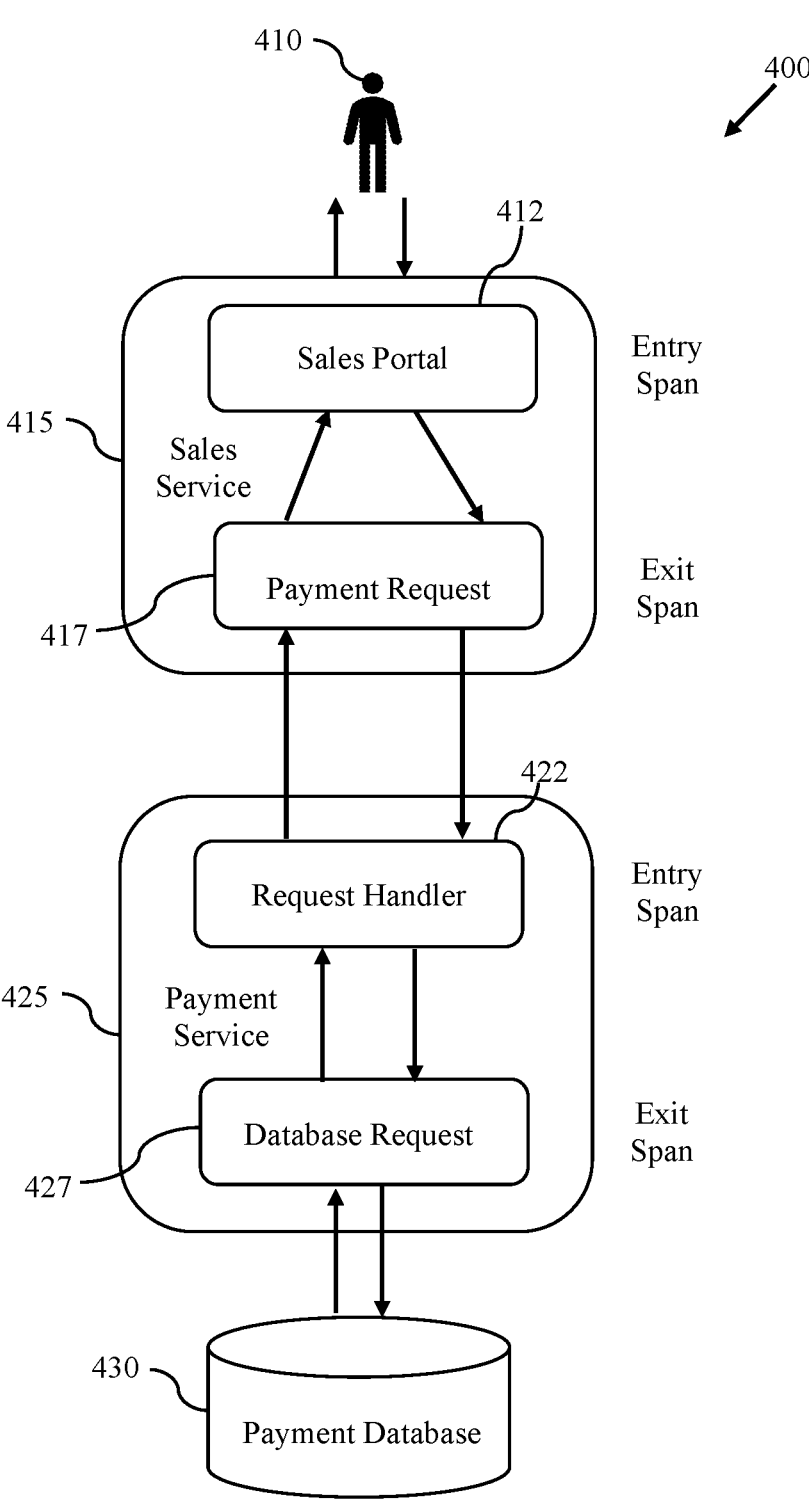
FIG. 4 illustrates an example end-to-end application, in accordance with embodiments of the present invention.

Referring now to FIG. 4, shown is an example end-to-end application 400, where a user 410 interacts with a Sales Portal 412 on a Sales Service 415 to make payments. This, in turn, uses a Payment Service 425 and a Payment Database 430.

In conventional approaches, measurements such as Throughput, Latency and Errors are collected for each of the services. This is done by measuring the service itself—i.e., the measurements for the Payment Service 425 are collected at the Request Handler 422 in the payment service 425 each time that the Payment Service 425 is called. Such an approach works well when the system is running successfully but is very limited and problematic when incidents are occurring (e.g., on a service that may be expiring a problem to measure itself). It also has no ability to understand or quantify failures that the caller may experience which are not the direct responsibility of the service (e.g., network or firewall problems), meaning that the service is unreachable by the caller. In these scenarios, there are failures (and associated impacts) that cannot be measured by the service itself.

According to the invention, it is proposed to move the measurement to the Caller entity, which is where it is possible to deterministically measure whether requests succeeded or failed. Additionally, moving the measurement to the Caller allows for fault tolerance capabilities such as retries to be considered, which appear at the Callee as separate requests.

In the above example of FIG. 4, the proposed approach of the invention moves the measurement from the Request Handler 422 in the Payment Service 425 to the Payment Request 417 in the Sales Service 415.

When failures are seen at the caller (e.g., the Sales Service 415 payment request handler 417), the failures are assigned to the callee (e.g., the Payment Service 425) and associated with an incident at the callee (e.g., the Payment Service 425).

Figure 5:
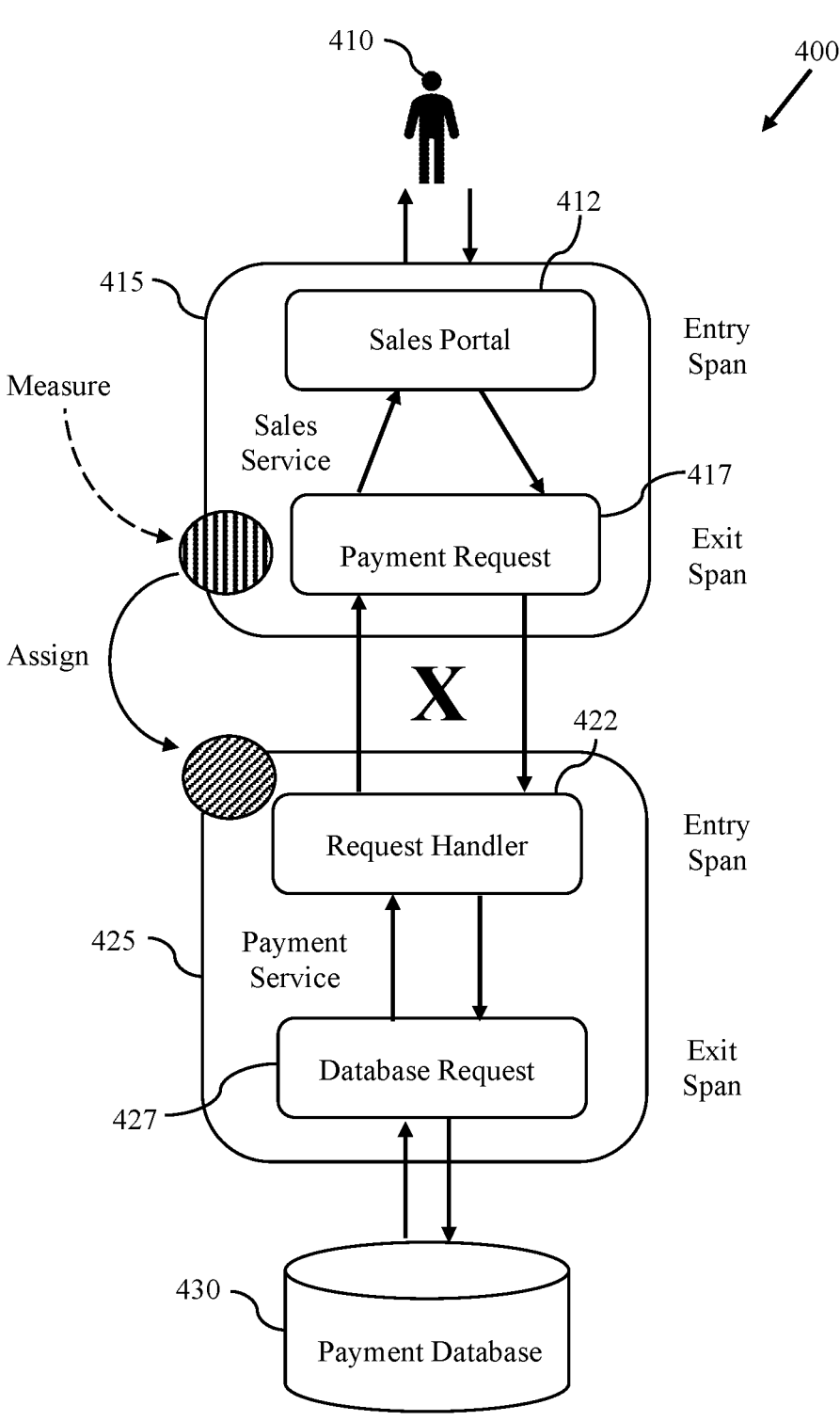
FIG. 5 illustrates a proposed approach of the invention applied to the application of FIG. 4, in accordance with some embodiments of the present invention.

As depicted in the diagram of FIG. 5, a request to the Payment Service 425 results in an error (denoted by a large "X"), which could be caused because of a problem in the Payment Service 425 itself. As there has been an error, there is an impact, and that is assigned to the Payment Service 425 and the goals associated with the Payment Service 425. This could equally be applied to any other type of incident, including availability, performance, or latency.

The proposed approach provides a deterministic quantification of the impact of an incident/error that affects the availability and corrects the working of a service and the IT and business function that it provides.

Figure 6:
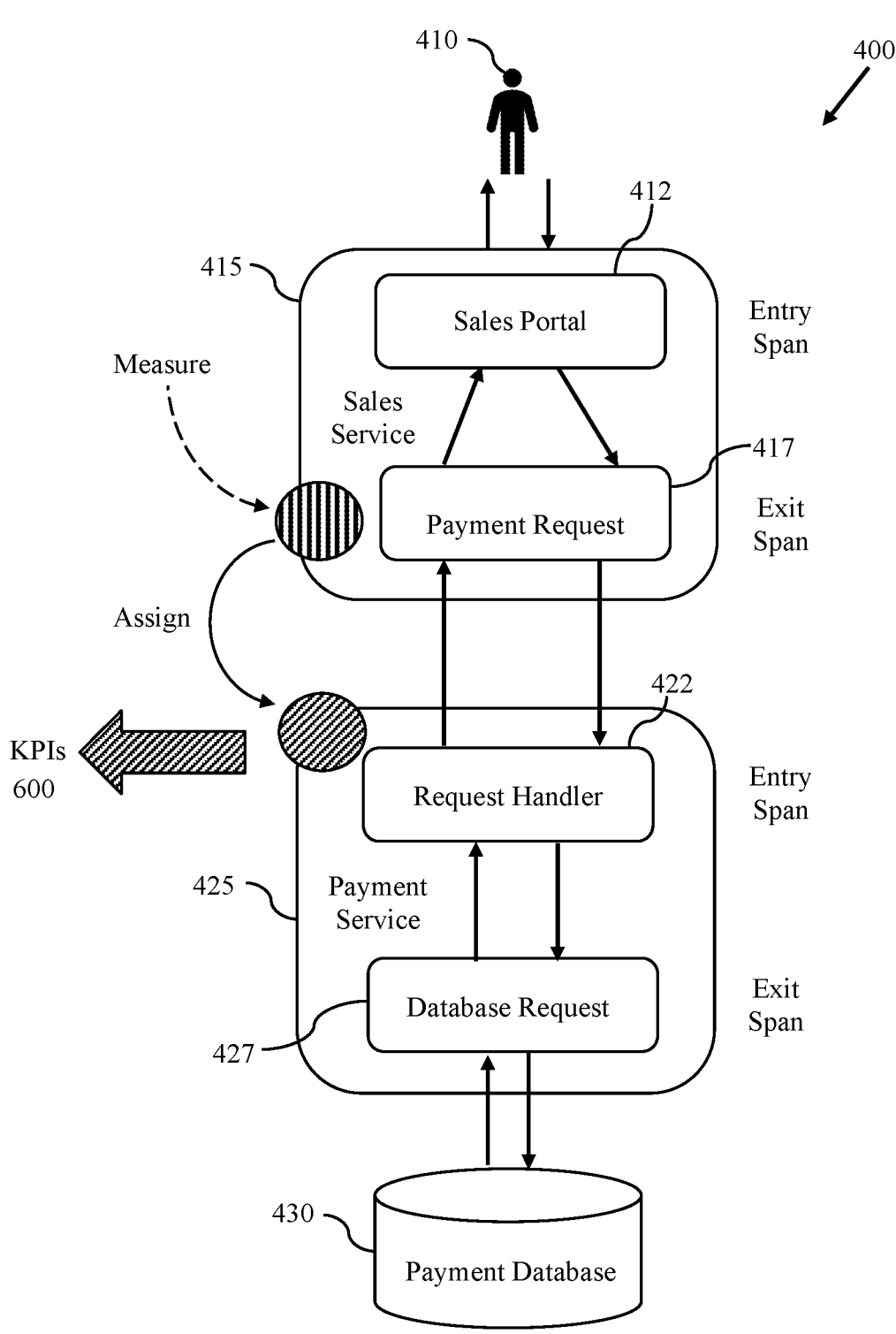
FIG. 6 illustrates collection and assignment of an API according to the proposed approach of FIG. 5, in accordance with some embodiments of the present invention.

Additionally, the caller also has information about the purpose of the request. In the example detailed above with reference to FIG. 5, the purpose is to make a payment of $20. As illustrated in FIG. 6, this enables additional business metrics to be collected and assign to the callee (e.g., the Payment Service 425) from which KPIs 600 can be measured.

Measuring the Effect on IT and Business KPIs

Service Level Objectives (SLOs) or Business KPIs can be created by creating calculations against available metrics and setting goals on those calculations. For example, the Payment Service might have the following IT SLOs and Business KPIs:

With them being measure with the following metrics and calculations:

(A) IT Service Level Objectives:
  Request Volume=COUNT(payment)
  Request Latency=SUM(payment.duration)/COUNT(payment)
(B) Business Key Performance Indicators:
  Total Sales=SUM(payment.value)
  Number Sales=COUNT(payment)
  Average Sales Size=SUM(payment.value)/COUNT(payment)

The impact of any incident is automatically calculated by automatically generating and providing a SLO or KPI impact calculation that shadows the SLO or KPI calculation. For example, the equivalent SLO and KPI impact calculations may be as follows:

(A) IT Service Level Objective Impacts:
  Request Volume=COUNT(payment+Failed payment)–COUNT(payment)
  Request Latency=SUM(payment.duration+Failed payment.duration)/=COUNT(payment+Failed payment)–COUNT(payment)
(B) Business Key Performance Indicator Impacts:
  Total Sales Impact=SUM(payment.value+Failed payment.value)–SUM(payment.value)
  Number of Sales Impact=COUNT(payments.value+Failed payment.value)–COUNT(payment.value)
  Average Sale Size Impact=SUM(payment.value+Failed payment.value)/COUNT(payment.value+Failed payment.value)–SUM(payment.value)/COUNT(payment.value)

This approach can be taken for any SLO or KPI, including those that take metrics and measurement from multiple services. Further, where there is an incident resulting in one or more failed requests, both the impact of the incident on any SLOs or KPIs is known, as is the list of the specific requests that failed.

It is also noted that this mechanism works for complex calculations, and calculations that build on top of each other. For example, taking the business KPI "total sales" as an example, the KPI is calculated using: Total Sales=SUM (payment.value). At a given point in time, this might have a value of $100,000.

In order to build the calculation of impact to this KPI where there are failed payments, an impact calculation can be automatically built that represents the original calculation if the failed requests succeeded, minus the original calculation without the failed requests. This pattern can be applied to any calculation that values from the failed requests, either directly or indirectly through other calculations.

For example, using the business KPI of Total Sales, which uses the payment.value data from the payment request, and assuming 100 successful payments at $1,000 and 1 failed payment at $5,000:
  Total Sales=SUM(payment.value)=$100,000
  Total Sales Impact=SUM(payment.value+failed payment.value)–SUM(payment.value)=$105,000-$100,000=$5,000

Considering Average Sale Size as a more complex business KPI with the same numbers, the calculation is as follows:
  Average Sale Size=SUM(payment.value)/COUNT(payment)=$100,000/100=$1,000
  Average Sale Size Impact=SUM(payment.value+Failed payment.value)/COUNT(payment.value+Failed payment.value)–SUM(payment.value)/COUNT(payment.value)=$105,000/101–$100,000/100=$1,039.6–$1,000=$39.6

Figure 7:
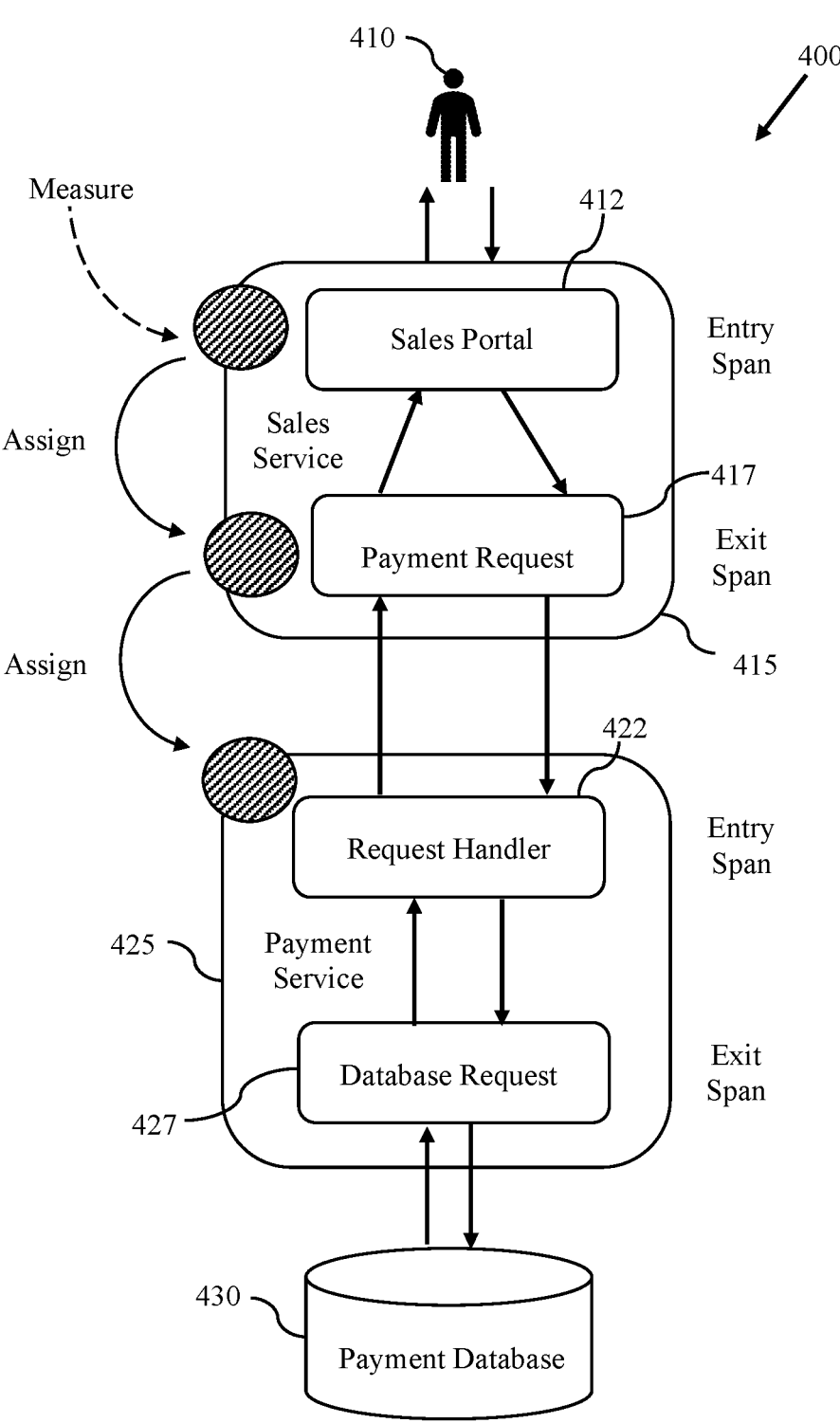
FIG. 7 illustrates propagation of a measure from the user to the service that is the cause of an incident, in accordance with some embodiments of the present invention.

The impact on users can be quantified and measured in a similar fashion. An effect is seen by a user or external actor if, and only if, that impact surfaces as part of the request or action that the user is taking. When that occurs, the measure is propagated from the user 410 to the called service, and this is propagated along the chain of services until it is assigned to the service that is the cause of the incident (as illustrated in FIG. 7). This associates affected users with IT incidents, and thus provides the ability to determine the number of affected users, who they are and what action they were taking. Further, this information can be used to generate a full impact report, and to implement business remediation processes such as customer retention services.

In summary, by moving measurement of an incident to a caller entity, proposed embodiments may provide an improved approach to quantifying impact of an error in a distributed computing environment. Additionally, moving the measurement to the caller may allow for fault tolerance capabilities to be considered.

From the above description, it will be understood that there are proposed concepts for determining and quantifying a technical performance impact of an error and/or a business performance impact of an error. These concepts may employ distributed tracing to track end-to-end requests across applications, starting from user or endpoint interactions. For instance, embodiments may use distributed tracing to: (i)

measure requests and determine failure impact; (ii) measure the effect on IT and business KPIs; and/or (iii) measure the Effect on Users.

Accordingly, embodiments may facilitate improved assessment by quantifying the impact in consideration of a service level metric of the distributed computing environment.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It should now be understood by those of skill in the art, in embodiments of the present invention, the proposed concepts provide numerous advantages over conventional transaction request handling approaches. These advantages include, but are not limited to, reduction of resource overhead associated with of creating specific classes of transaction.

In still further advantages to a technical problem, the systems and processes described herein provide a computer-implemented method for efficient schema generation. In this case, a computer infrastructure, such as the computer system shown in FIGS. 1 and 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 2, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for quantifying impact of one or more errors in a distributed computing environment, the method comprising:

utilizing a distributed tracing to track end-to-end requests across applications, starting from a user;

creating Service Level Objectives (SLOs) and Business Key Performance Indicators (KPIs) by creating calculations against available metrics and setting goals to the calculations;

detecting, at a caller entity of the distributed computing environment, an error, based on the distributed tracing, resulting from a request from the caller entity to a callee entity of the distributed computing environment;

associating the detected error with a callee incident, the callee incident describing an abnormal operating condition of the callee entity;

quantifying an impact of the error based on the callee incident associated with the detected error and a service level metric of the distributed computing environment;

generating an impact report based on the quantified impact to implement a remediation;

providing a deterministic quantification of an impact associated with the impact report, wherein the quantification of the impact comprises:

calculating an impact value based on the callee incident associated with the detected error and a count value of the service level metric;

facilitating improved assessment by quantifying and measuring an impact based on the impact report in consideration of a service level metric of the distributed computing environment, wherein the measure measuring is propagated along a chain of services until it is assigned to the service that is the cause of the incident; and correcting a working of a service by providing a deterministic quantification of the impact of the detected error that affects a predetermined availability of the service and corrects the working of the service, information technology (IT), and business function by moving a measurement of an incident to a caller entity to enable fault tolerance capabilities and by associating the detected error with a callee incident and quantifying the impact of the error based on the callee incident and a service level metric of the distributed computing environment.

2. The method of claim 1, wherein the request is a service request for requesting performance or delivery of a service by the callee entity.

3. The method of claim 1, wherein the service level metric comprises a predetermined service level metric or key performance indicator associated with the callee entity.

4. The method of claim 1, wherein quantifying an impact of the error comprises calculating an impact value based on the callee incident associated with the detected error and a count value of the service level metric.

5. The method of claim 4, wherein calculating the impact value comprises calculating a value signifying a first count value representing non-occurrence of the error minus a second count value representing occurrence of the error.

6. The method of claim 1, wherein the quantified impact comprises a fractional value.

7. The method of claim 1, wherein the quantified impact comprises an averaged value.

8. The method of claim 1, wherein the distributed computing environment comprises a transaction processing environment.

9. A system comprising:

a processor; and a computer-readable storage medium communicatively coupled to the processor and storing program instructions which, when executed by the processor, cause the processor to perform a method for quantifying impact of one or more errors in a distributed computing environment, the method comprising:

utilizing a distributed tracing to track end-to-end requests across applications, starting from a user;

creating Service Level Objectives (SLOs) and Business Key Performance Indicators (KPIs) by creating calculations against available metrics and setting goals to the calculations;

detecting, at a caller entity of the distributed computing environment, an error, based on the distributed tracing, resulting from a request from the caller entity to a callee entity of the distributed computing environment;

associating the detected error with a callee incident, the callee incident describing an abnormal operating condition of the callee entity;

quantifying an impact of the error based on the callee incident associated with the detected error and a service level metric of the distributed computing environment;

generating an impact report based on the quantified impact to implement a remediation;

providing a deterministic quantification of an impact associated with the impact report, wherein the quantification of the impact comprises:

calculating an impact value based on the callee incident associated with the detected error and a count value of the service level metric;

facilitating improved assessment by quantifying and measuring an impact based on the impact report in consideration of a service level metric of the distributed computing environment, wherein the measure measuring is propagated along a chain of services until it is assigned to the service that is the cause of the incident; and correcting a working of a service by providing a deterministic quantification of the impact of the detected error that affects a predetermined availability of the service and corrects the working of the service, information technology (IT), and business function by moving a measurement of an incident to a caller entity to enable fault tolerance capabilities and by associating the detected error with a callee incident and quantifying the impact of the error based on the callee incident and a service level metric of the distributed computing environment.

10. The system of claim 9, wherein the request is a service request for requesting performance or delivery of a service by the callee entity.

11. The system of claim 9, wherein the service level metric comprises a predetermined service level metric or key performance indicator associated with the callee entity.

12. The system of claim 9, wherein quantifying an impact of the error comprises calculating an impact value based on the callee incident associated with the detected error and a count value of the service level metric.

13. The system of claim 12, wherein calculating an impact value comprises calculating a value signifying a first count value representing non-occurrence of the error minus a second count value representing occurrence of the error.

14. The system of claim 9, wherein the quantified impact comprises a fractional value.

15. A computer-readable storage medium having program instructions embodied therewith, the program instructions executable by a processor to cause the processor to perform a method for quantifying impact of one or more errors in a distributed computing environment, the method comprising:

utilizing a distributed tracing to track end-to-end requests across applications, starting from a user;

creating Service Level Objectives (SLOs) and Business Key Performance Indicators (KPIs) by creating calculations against available metrics and setting goals to the calculations;

detecting, at a caller entity of the distributed computing environment, an error, based on the distributed tracing, resulting from a request from the caller entity to a callee entity of the distributed computing environment;

associating the detected error with a callee incident, the callee incident describing an abnormal operating condition of the callee entity;

quantifying an impact of the error based on the callee incident associated with the detected error and a service level metric of the distributed computing environment;

generating an impact report based on the quantified impact to implement a remediation;

providing a deterministic quantification of an impact associated with the impact report, wherein the quantification of the impact comprises:

calculating an impact value based on the callee incident associated with the detected error and a count value of the service level metric;

facilitating improved assessment by quantifying and measuring an impact based on the impact report in consideration of a service level metric of the distributed computing environment, wherein the measure measuring is propagated along a chain of services until it is assigned to the service that is the cause of the incident; and correcting a working of a service by providing a deterministic quantification of the impact of the detected error that affects a predetermined availability of the service and corrects the working of the service, information technology (IT), and business function by moving a measurement of an incident to a caller entity to enable fault tolerance capabilities and by associating the detected error with a callee incident and quantifying the impact of the error based on the callee incident and a service level metric of the distributed computing environment.

16. The computer-readable storage medium of claim 15, wherein the request is a service request for requesting performance or delivery of a service by the callee entity.

17. The computer-readable storage medium of claim 15, wherein the service level metric comprises a predetermined service level metric or key performance indicator associated with the callee entity.

18. The computer-readable storage medium of claim 15, wherein quantifying an impact of the error comprises calculating an impact value based on the callee incident associated with the detected error and a count value of the service level metric.

19. The computer-readable storage medium of claim 18, wherein calculating an impact value comprises calculating a value signifying a first count value representing non-occurrence of the error minus a second count value representing occurrence of the error.

20. The computer-readable storage medium of claim 15, wherein the quantified impact comprises a fractional value.

\* \* \* \* \*